(12) United States Patent
Yamamoto et al.

(10) Patent No.: US 8,923,669 B2
(45) Date of Patent: Dec. 30, 2014

(54) OPTICAL WAVEGUIDE AND METHOD OF MANUFACTURING THE SAME, AND OPTICAL WAVEGUIDE DEVICE

(75) Inventors: Takanori Yamamoto, Nagano (JP); Mieko Yamamoto, legal representative, Nagano (JP); Hideki Yonekura, Nagano (JP); Kenji Yanagisawa, Nagano (JP); Kazunao Yamamoto, Nagano (JP)

(73) Assignee: Shinko Electric Industries Co., Ltd., Nagano-shi (JP)

( * ) Notice: Subject to any disclaimer, the term of this patent is extended or adjusted under 35 U.S.C. 154(b) by 1 day.

(21) Appl. No.: 13/470,505

(22) Filed: May 14, 2012

(65) Prior Publication Data
US 2012/0318964 A1 Dec. 20, 2012

(30) Foreign Application Priority Data
Jun. 14, 2011 (JP) ................................. 2011-131779

(51) Int. Cl.
G02B 6/26 (2006.01)
G02B 6/138 (2006.01)
B29D 11/00 (2006.01)
G02B 6/42 (2006.01)
G02B 6/43 (2006.01)
G02B 6/12 (2006.01)

(52) U.S. Cl.
CPC .......... G02B 6/138 (2013.01); B29D 11/00663 (2013.01); G02B 6/4214 (2013.01); G02B 6/43 (2013.01); G02B 6/12004 (2013.01)
USPC .......................................... 385/31; 385/129

(58) Field of Classification Search
CPC .. G02B 2006/12176; G02B 6/42; G02B 6/43; G02B 6/125; G02B 6/4214

USPC ............. 385/31, 14, 47, 48, 129; 250/227.11; 427/162; 264/1.24
See application file for complete search history.

(56) References Cited

U.S. PATENT DOCUMENTS

| | | | |
|---|---|---|---|
| 6,741,781 B2 * | 5/2004 | Furuyama | 385/129 |
| 6,973,248 B2 * | 12/2005 | Kropp | 385/131 |
| 7,646,531 B1 * | 1/2010 | Almoric et al. | 359/332 |
| 2002/0001427 A1 * | 1/2002 | Hashimoto et al. | 385/14 |
| 2002/0039475 A1 * | 4/2002 | Furuyama | 385/129 |
| 2002/0118907 A1 * | 8/2002 | Sugama et al. | 385/14 |
| 2004/0033016 A1 * | 2/2004 | Kropp | 385/31 |

(Continued)

FOREIGN PATENT DOCUMENTS

| | | |
|---|---|---|
| JP | 11-248954 | 9/1999 |
| JP | 2009-20391 A1 | 1/2009 |
| WO | WO 03/058305 A1 | 7/2003 |

*Primary Examiner* — Peter Radkowski
(74) *Attorney, Agent, or Firm* — Kratz, Quintos & Hanson, LLP

(57) ABSTRACT

An optical wave guide includes an optical waveguide layer in which a core layer is surrounded by a cladding layer, a light path converting portion provided to a light entering side and a light emitting side of the optical waveguide layer respectively, a light entering portion demarcated in an outer surface of the cladding layer, in which a light is entered to the light path converting portion of the light entering side; and a light emitting portion demarcated in an outer surface of the cladding layer, in which a light from the light path converting portion of the light emitting side is emitted, wherein an outer surface of the cladding layer except the light entering portion and the light emitting portion is formed as a roughened surface.

9 Claims, 17 Drawing Sheets

(56) References Cited

U.S. PATENT DOCUMENTS

| | | | |
|---|---|---|---|
| 2004/0037487 A1* | 2/2004 | Nakaya et al. | 385/14 |
| 2005/0237602 A1* | 10/2005 | Yanagisawa | 359/340 |
| 2006/0110114 A1* | 5/2006 | Yanagisawa et al. | 385/129 |
| 2006/0275004 A1* | 12/2006 | Fujii et al. | 385/129 |
| 2008/0279518 A1* | 11/2008 | Yonekura et al. | 385/127 |
| 2009/0297086 A1* | 12/2009 | Sugamata et al. | 385/2 |
| 2011/0091181 A1* | 4/2011 | DeMeritt et al. | 385/140 |

* cited by examiner

OPTICAL WAVEGUIDE AND METHOD OF MANUFACTURING THE SAME, AND OPTICAL WAVEGUIDE DEVICE

GROSS-REFERENCE TO RELATED APPLICATIONS

This application is based upon and claims the benefit of priority of the prior Japanese Patent Application No 2011-131779, filed on Jun. 14, 2011; the entire contents of which are incorporated herein by reference.

FIELD

It is related to an optical waveguide and a method of manufacturing the same, and an optical waveguide device using the optical waveguide.

BACKGROUND

Recently, the development of the backbone network communication line as mainly focusing on the optical fiber communication technology is proceeding steadily and, in such a situation, the electronic wirings in the information terminal are becoming a bottleneck. Against, such background, instead of the conventional electric circuit substrate in which all signal transmissions are made by using the electric signal, the optoelectronic composite substrate (optical waveguide device) of the type that transmits high-speed parts by the light has been proposed, in order to compensate the limit of transmission speed of the electric signal.

In the optoelectronic composite substrate, the light signal is transmitted by the optical waveguide having a structure in which the core layer is surrounded by the cladding layers. Then, the light path is converted at 90° by the light path conversion portion provided to the end part of the optical waveguide.

The related arts are disclosed in Japanese Laid-open Patent Publication No. 2009-20391 and In Publication Pamphlet. No. WO 2003/58305, and Japanese Laid-open Patent Publication. No. 11-24894.

In the optical waveguide device, a plurality of emitting portions of the emitting element are optically coupled to light entering portions of respective light paths of the optical waveguide respectively, and the lights are emitted from the respective emitting portions to the respective light entering portions respectively. Here, the light being emitted from the respective emitting portions of the emitting element is emitted to spread to the lateral, direction as well.

For this reason, particularly, in the case that the light paths of the optical waveguide are arranged at a narrow pitch, the lights being emitted from the emitting portion are entered to the adjacent light path as the unnecessary light. As a result, such a problem exists that the optical crosstalk is generated and thus degradation of the light signal is brought about.

Also, at the time when the lights are entered to the respective light receiving portions of the light receiving element, from the light emitting portions of the respective light paths of the optical waveguide respectively as well the similar optical crosstalk is easily caused due to the reflected light from the light path conversion portion.

SUMMARY

According to one aspect discussed herein, there is provided an optical waveguide, which includes an optical waveguide layer in which a core layer is surrounded by a cladding layer, a light path converting portion provided to a light entering side and a light emitting side of the optical waveguide layer respectively, a light entering portion demarcated in an outer surface of the cladding layer, in which a light is entered to the light path converting portion of the light entering side, and a light emitting portion demarcated in an outer surface of the cladding layer, in which a light from the light path converting portion of the light emitting side is emitted, wherein an outer surface of the cladding layer except the light entering portion and the light emitting portion is formed as a roughened surface.

According to another aspect discussed herein, there is provided an optical waveguide device, which includes the optical waveguide set forth in any one of claims 1 to 4, a wiring substrate arranged on the roughened surface of the optical waveguide, a light emitting element mounted on the wiring substrate, and optically coupled to the light, path converting portion of the light entering side of the optical waveguide, and a light receiving element mounted on the wiring substrate, and optically coupled to the light path converting portion of the light emitting side of the optical waveguide.

According to still another aspect discussed herein, there is provided an optical waveguide device, which includes the optical waveguide set forth in any one of claims 1 to 4, and arranged such that the roughened surface is directed upward, a wiring substrate arranged under the optical waveguide, a protection insulating layer formed on the roughened surface of the optical waveguide, and in which an opening portion is provided on the light entering portion and the light emitting portion of the optical waveguide, a light emitting element mounted on the wiring substrate, and optically coupled to the light path converting portion of the light entering side of the optical waveguide, and a light receiving element mounted on the wiring substrate, and optically coupled to the light path converting portion of the light emitting side of the optical waveguide.

The object and advantages of the invention will be realized and attained by means of the elements and combination particularly pointed out in the claims.

It is to be understood that both the foregoing general description and the following detained description are exemplary and explanatory and are not restrictive of the invention, as claimed.

BRIEF DESCRIPTION OF THE DRAWINGS

FIG. 6 is a sectional view depicting another optical waveguide according to the first embodiment;

DESCRIPTION OF EMBODIMENTS

Embodiments will be explained with reference to the accompanying drawings hereinafter.

First Embodiment

Figure 7:
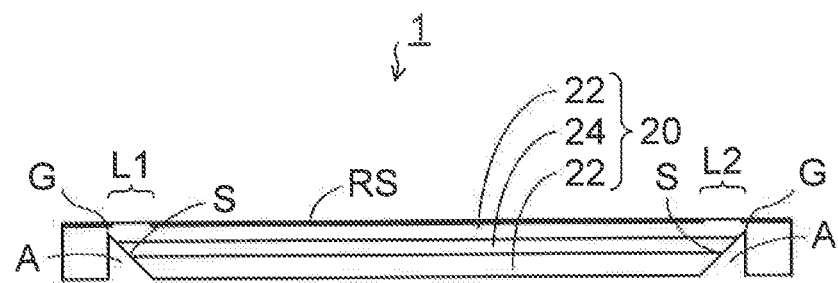
FIG. 7 is a sectional view depicting an optical waveguide according to the first embodiment.
Figure 8:
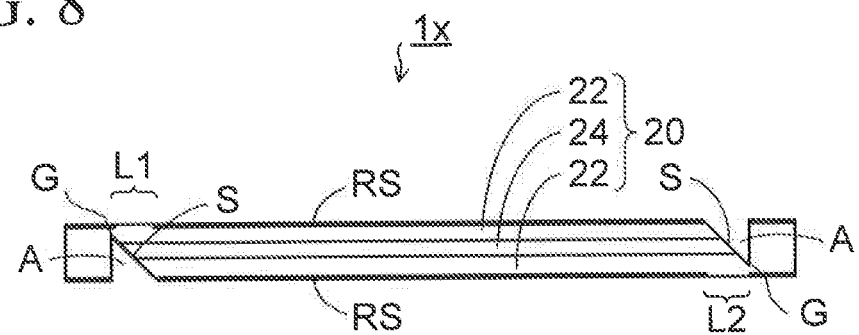

FIG. 1 to FIG. 6 are views depicting a method of manufacturing an optical waveguide according to a first embodiment. FIG. 7 is a sectional view depicting an optical waveguide according to the first embodiment, and FIG. 8 is a sectional view depicting a optical waveguide device according to the first embodiment.

Figure 1:
FIG. 1 is a sectional view (#1) depicting a method of manufacturing an optical waveguide according to a first embodiment.

In the method of manufacturing the optical waveguide according to the first embodiment, as depicted in FIG. 1, first, a substrate 10 is prepared. The substrate 10 is prepared as a temporary substrate which is removed finally. This substrate 10 is formed of a polycarbonate resin, or the like that can be peeled off and be removed.

Figure 2:
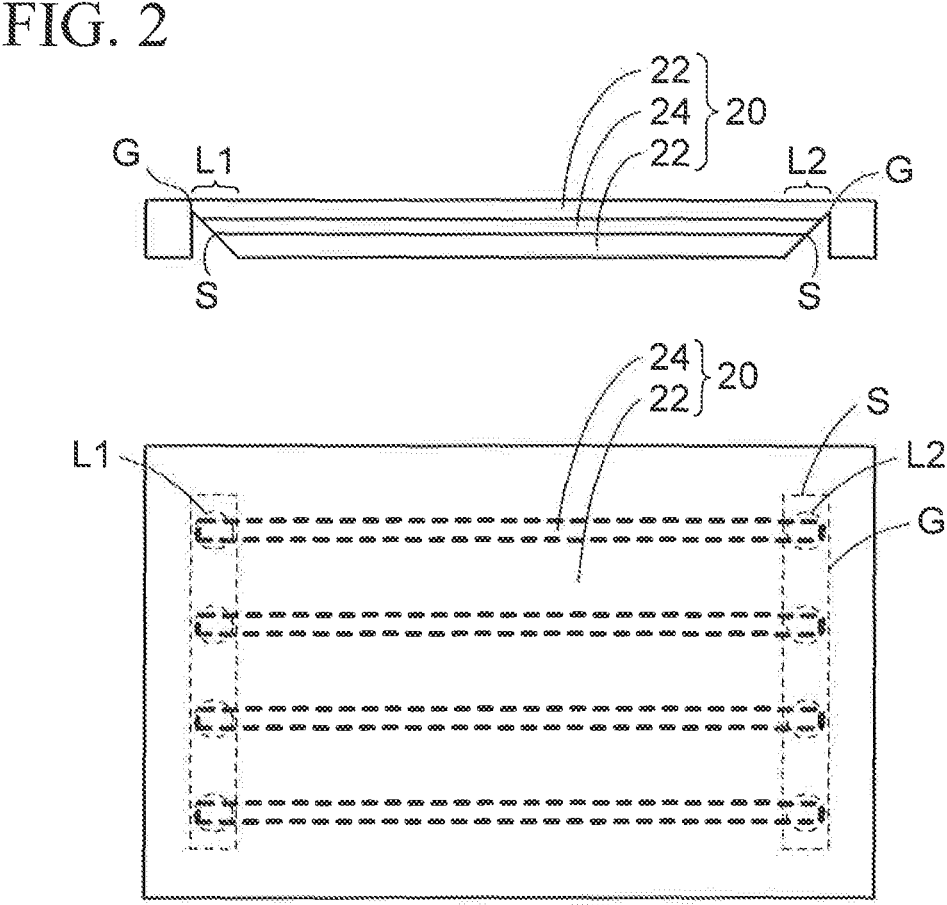
FIG. 2 is a sectional view and a clan view (#2) depicting, the method of manufacturing the optical waveguide according to the first embodiment.

Then, as depicted in FIG. 2, an optical waveguide layer 20 having a structure in which a core layer 24 is surrounded by a cladding layer 22 is prepared. An upper side view of FIG. 2 is a sectional view, and a lower side view of FIG. 2 is a plan view. This situation is similar in FIG. 3 to FIG. 6 depicted hereinafter.

A refractive index of the core layer 24 is set higher than a refractive index of the cladding layer 22. As the material of the core layer 24 and the cladding layer 22, a fluorinated polyimide resin, an epoxy resin, a silicone resin, or the like is preferably used.

The belt-like core layers 24 each extended in the lateral direction are arranged side by side in the longitudinal direction. In the example in FIG. 2, the core layers 24 functioning as four light paths are depicted.

An inverse V-shaped groove G which divides the underlying cladding layer 22 and the core layer 24 is provided on both end parts of the optical waveguide layer 20 respectively. An inner surface of the groove G located on the inner side functions as a light path conversion inclined surface S (light path converting portion). The light path conversion inclined surface S on one and side (left side in FIG. 2) functions as the light path converting portion of the light entering side, whereas the light path conversion inclined surface S on the other side (right side in FIG. 2) functions as the light path converting portion of the light emitting side.

The light path conversion inclined surface S is inclined to rise toward the outside from the inside, and intersects with the extending direction (light propagation direction) of the core layer 24 at a predetermined angle (preferably, 45°).

In the example in FIG. 2, the light path conversion inclined surface S is provided on both end parts of the optical waveguide layer 20 respectively, thereby one system of light paths is formed. In contrast, the light path conversion inclined surfaces S may be provided to the center part of the optical waveguide layer 20, thereby two systems of light paths may be formed in the optical waveguide layer 20.

Then, light entering portions L1 are demarcated in the positions, which correspond to the light path conversion inclined surface S on the light entering side of one end side (left side). The lights being emitted from the light emitting element are entered to the light path conversion inclined surface S from the light entering portions L1.

Then, light emitting portions L2 are demarcated in the positions, which correspond to the light path conversion inclined surface S on the light emitting side of the other end side (right side). The lights from the light path conversion inclined surface S are emitted to the light receiving element from the light emitting portions L2.

Figure 3:
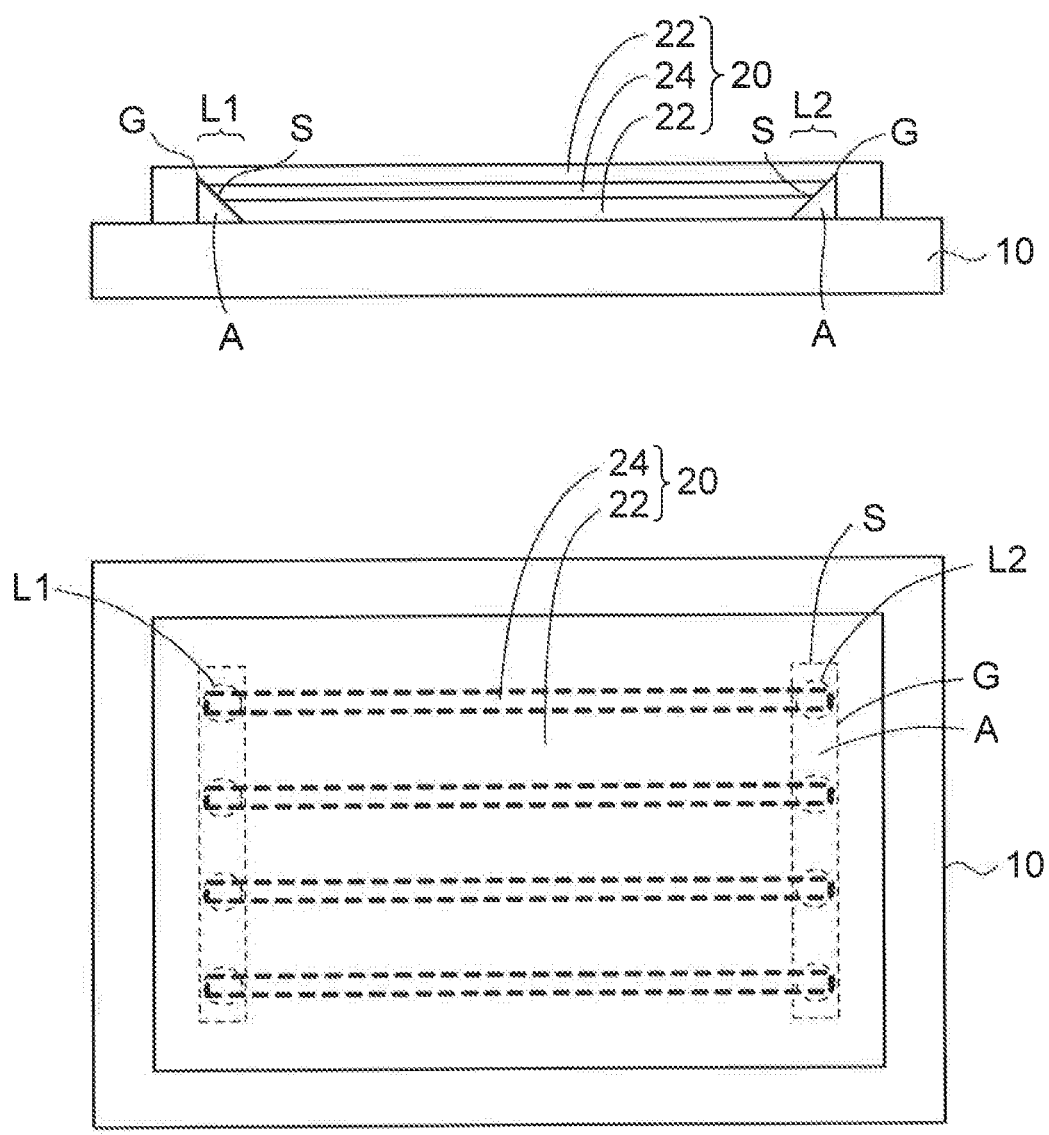
FIG. 3 is a sectional view and a plan view (#3) depicting the method of manufacturing the optical waveguide according to the first embodiment.

Then, as depicted in FIG. 3, the underlying cladding layer 22 of the optical waveguide layer 20 is temporarily adhered onto the substrate 10. An inner part of the groove G containing the light path conversion inclined surface S of the optical waveguide layer 20 constitutes an air layer A. The light paths which propagate through the core layers 24 are converted at 90° by the air boundary of the light path conversion inclined surface S.

Accordingly, it is needed that the air layer A which contacts the light path conversion inclined surface S of the optical waveguide layer 20 should not be filled with the adhesive agent and this air layer A should be still remained. For this purpose, a resin film (not shown) kept in a semi cured state and having low fluidity is used as the adhesive agent, and the optical waveguide layer 20 is arranged on the substrate 10 via the resin film, and then the optical waveguide layer 20 is adhered by applying the heating process to cure the resin film. By this matter, the air layer A which contacts the light path conversion inclined surface S is not, filled, with the adhesive agent, with this situation, the optical waveguide layer 20 is adhered onto the substrate 10.

Alternatively, the area of the optical waveguide layer 20, which is located on the inner side than the air lever A, may be partially and temporarily adhered onto the substrate 10 by using the adhesive agent.

In the first embodiment, the light path conversion inclined surface S and the air layer A contacting thereto are employed as the light path converting portion of the optical waveguide layer 20. Besides, like a second embodiment described later, an optical waveguide layer that employs a metal layer arranged on the light path conversion inclined surface S, as the light path conversion mirror may be temporarily adhered onto the substrate 10 similarly.

Figure 4:
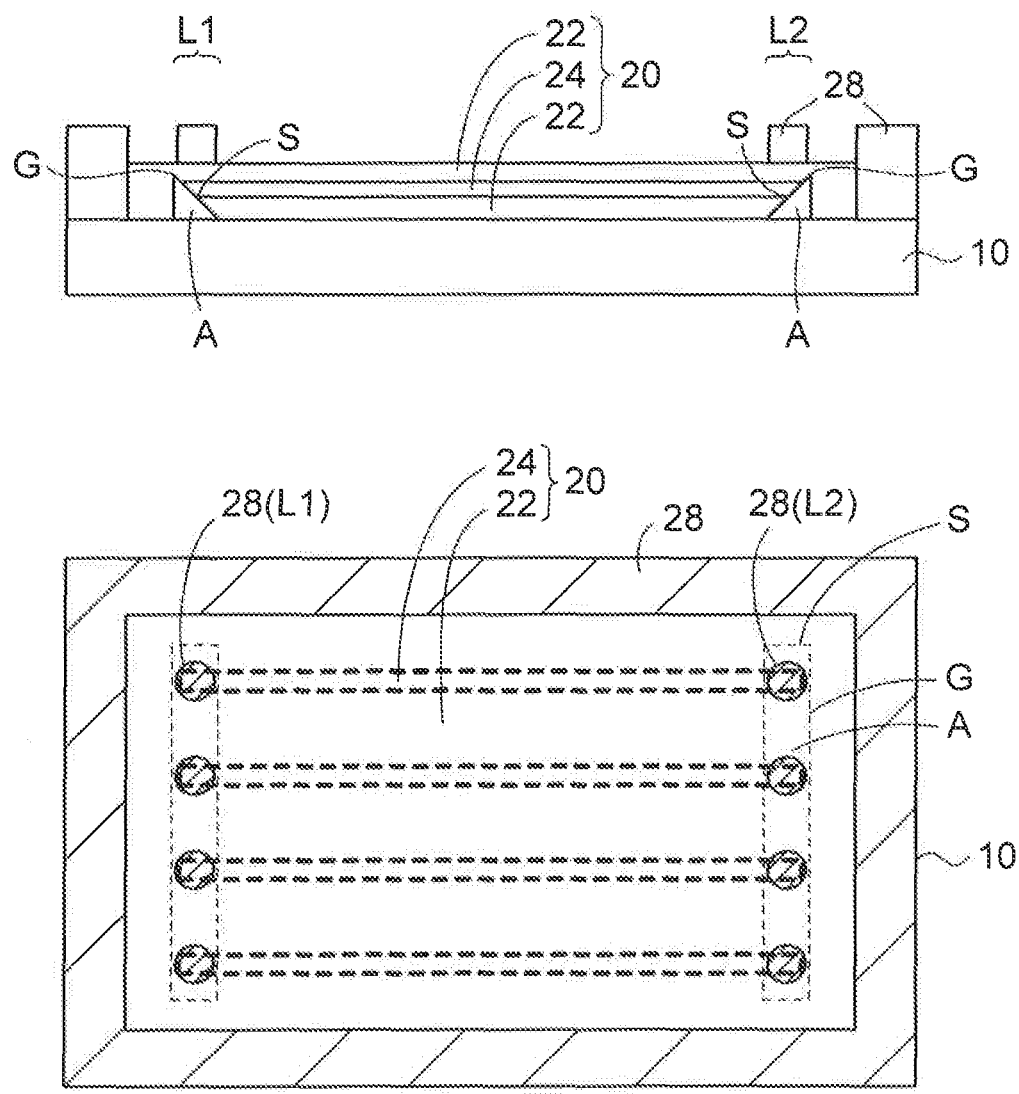
FIG. 4 is a sectional view and a plan view it depicting the method of manufacturing the optical waveguide according to the first embodiment.

Then, as depicted in FIG. 4, resist patterns 28 are formed on the light entering portions L1 and the light emitting portions L2 of the cladding layer 22 of the optical waveguide layer 20 and they are protected by the resist pattern 28. The resist pattern 28 is formed at the same time on the substrate 10 on the periphery of the optical waveguide layer 20. In a plan view of FIG. 4, the resist pattern 28 is depicted as the hatched part.

The resist pattern 28 is formed by either pasting a dry film resist or applying is liquid resist, and then exposing/developing the resist based on the photolithography. The resist pattern 28 is illustrated as a mask pattern. Besides, any mask material that can be patterned and then removed may be used.

Figure 5:
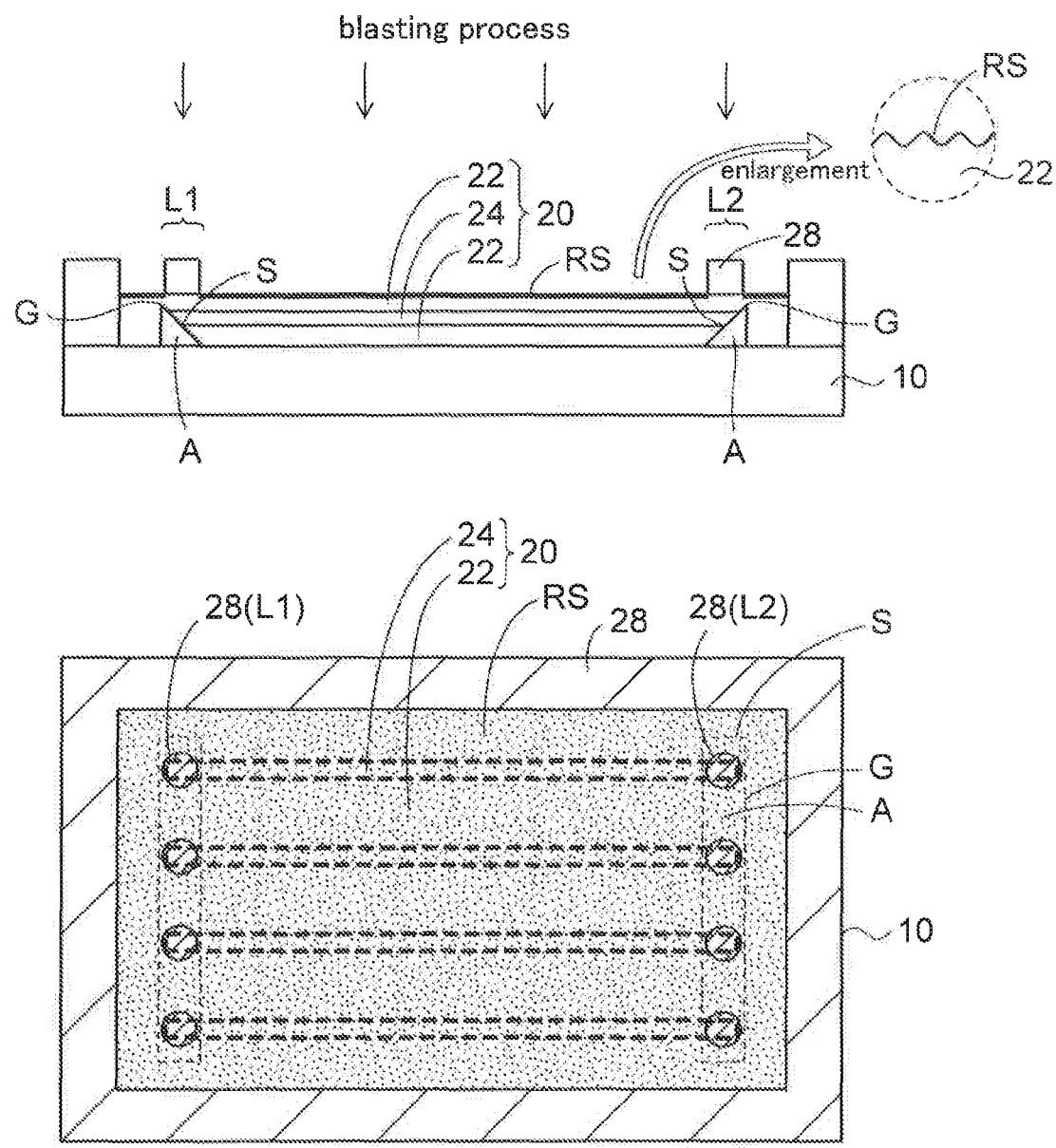
FIG. 5 is a sectional view and a plan view (#5) depicting the method of manufacturing the optical waveguide according to the first embodiment.

Subsequently, as depicted in FIG. 5, the blasting process is applied to the exposed surface of the cladding layer 22 while using the resist pattern 28 as a mask, and thus such exposed surface is roughened like the pear-skin finish. That is, as depicted in a fragmental enlarged view of a sectional view of FIG. 5, fine unevenness is formed on the surface of the cladding layer 22, and a roughened surface RS is obtained. Preferably a surface roughness (Ra) of the roughened surface RS of the cladding layer 22 should be set in a range of 1 μm or more and 3 μm or less.

The roughened surface RS of the cladding layer 22 is depicted as the thick line part in a sectional, view of FIG. 5, and also is depicted as the dot-shaded part in a plan view of FIG. 5.

The blasting process is such a process that the grinding material is jetted toward the processing surface at a high speed by using a compressed air, a centrifugal force, or the like, thereby the processing surface is processed by the impact force. Preferably, there is a sand blasting method that jets the abrasive material such as silica sands (powders), or the like toward the processing surface by using a means such as a compressed air, or the like. The roughened surface having a required roughness can be formed easily by the blasting process. Even though the material of the cladding layer 22 is changed, the roughened surface RS can be formed easily by using the blasting process.

The surface of the cladding layer 22 except the light entering portions L1 and the light emitting portions L2 is formed as the roughened surface RS. By this matter, the lights are reflected diffusely and attenuated by the roughened surface RS. Therefore, the unnecessary lights can be decreased and as a result the optical crosstalk can be prevented.

Figure 6:
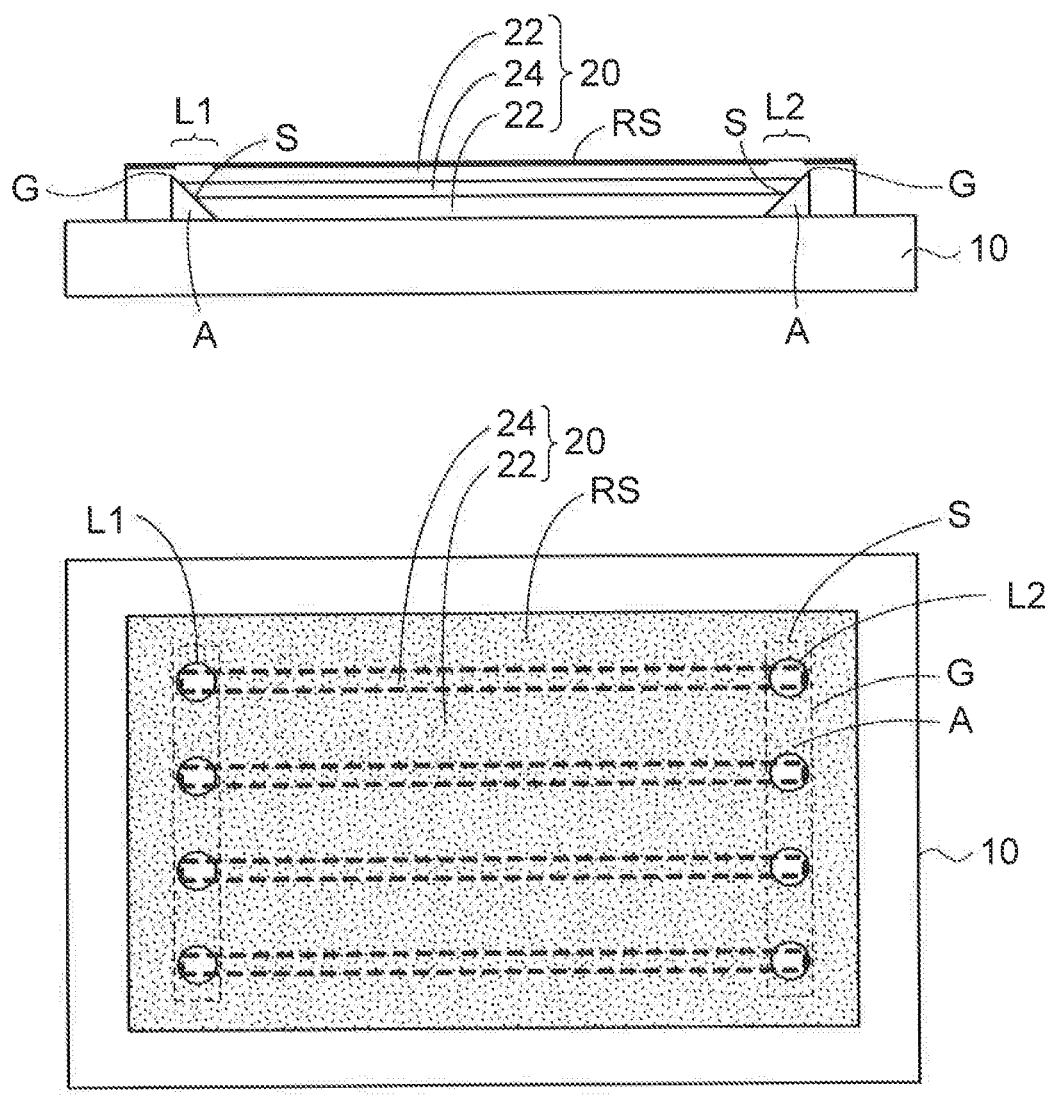
FIG. 6 is a sectional view and a plan view (#6) depicting the method of manufacturing the optical waveguide according to the first embodiment.

Then, as depicted in FIG. 6, the resist pattern 28 is removed by applying the ashing or by using the resist stripper. The light entering portions L1 and the light emitting portions L2 of the cladding layer 22 of the optical waveguide layer are protected by the resist pattern 28, Therefore, the light entering portions L1 and the light emitting portions L2 are not subjected to the blasting process, and are still maintained as a smooth surface (transparent surface).

Then, as depicted in FIG. 7, a lower surface of the underlying cladding layer 22 is exposed by removing the substrate 10 from the structural body in FIG. 6. Because the substrate 10 is made of a polycarbonate resin, or the like, the substrate 10 can be easily removed by peeling off it from the underlying cladding layer 22.

With the above, an optical waveguide 1 according to the first embodiment can be obtained.

As depicted in FIG. 7, the optical waveguide 1 of the first embodiment includes the optical waveguide layer 20 in which the core layers 24 are surrounded by the cladding layer 22. The light path conversion inclined surfaces S the light path converting portions) are provided to oppose to each other at both end parts on the light entering side and the light emitting side of the optical waveguide layer 20. The light path can be converted at 90° in the air boundary between the light path conversion inclined surface S and the air layer A.

The light path conversion inclined surface S provided on one end side (left side) or the optical waveguide layer 20 is used for the light entering. The light entering portions L1 are demarcated in the positions, which correspond to the light path conversion inclined surface S, on an outer surface of the cladding layer 22. Also, the light path conversion inclined surface S provided on the other end side (right side) of the optical waveguide layer 20 is used for the light emitting. The light emitting portions L2 are demarcated in the positions, which correspond to the light path conversion inclined surface S, on the outer surface of the cladding layer 22.

Then, with regard to the outer surface of the cladding layer 22 (in the example in FIG. 7, the upper surface of the overlying cladding layer 22) in which the light entering portions L1 and the light emitting portions L2 are demarcated, the outer surface except the light entering portions L1 and the light emitting portions L2 is formed as the roughened surface RS (see a plan view of FIG. 6 together). The roughened surface RS is depicted by the thick-line part in FIG. 7, whereas this roughened surface RS is depicted by the dot-shaded part in a plan view of FIG. 6.

Also, on the contrary to FIG. 7, the light path conversion inclined surface S may be formed such that the light entering portions L1 and the light emitting portions L2 are demarcated on the outer surface (lower surface) of the underlying cladding layer 22. In this case, the areas except the light entering portions L1 and the light emitting art ions L2 may be formed similarly as the roughened surface RS on the outer surface (lower surface) of the underlying cladding layer 22.

In this manner, in the optical waveguide 1 of the first embodiment, the outer surface of the cladding layer 22 except the light entering portions L1 and the light emitting portions L2 is formed as the roughened surface RS. Therefore, the lights entered to the outside areas of the light entering portions L1 and the light emitting portions L2 are reflected diffusely and attenuated by the roughened surface RS. As a result, the unnecessary lights can be decreased, and the optical crosstalk can be prevented.

Also, like another optical waveguide 1x depicted in FIG. 8, the light path conversion inclined surfaces S may be formed respectively such that the light entering portions L1 are demarcated on the overlying outer surface (upper surface) of the optical waveguide 1x, whereas the light emitting portions L2 are demarcated on the underlying outer surface (lower surface) of the optical waveguide 1x.

In this case, the outer surface (upper surface) of the overlying cladding layer 22 except the light entering portions L1 may be formed as the roughened surface RS, and also the outer surface (lower surface) of the underlying cladding layer 22 except the light emitting portions L2 may be formed as the roughened surface RS. That is, in the optical waveguide 1x utilizing both surface sides as the light path, the outer surface of the cladding layer 22 except the light path portion is roughened on both surface sides of the optical waveguide 1x respectively.

Next, an optical waveguide device manufactured by using the optical waveguide 1 according to the first embodiment will be explained hereunder.

Figure 9:
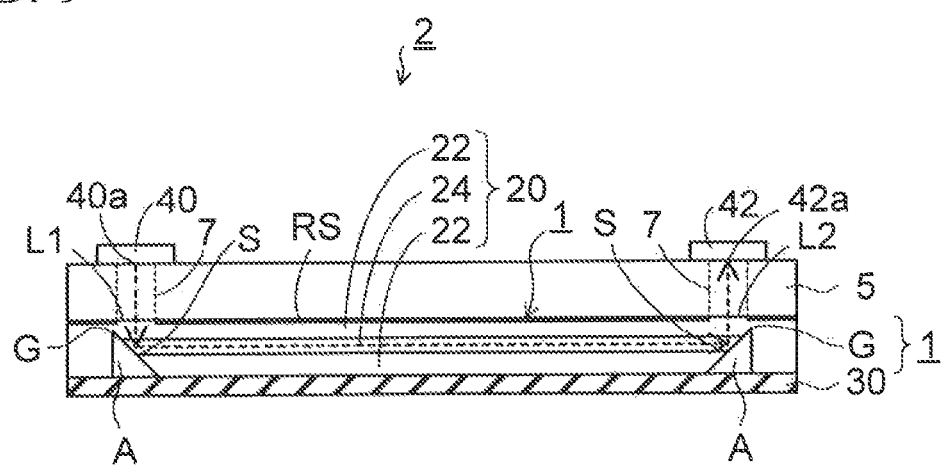
FIG. 9 is a sectional view depicting an optical waveguide device according to the first embodiment.

As depicted in FIG. 9, in an optical waveguide device 2 according to the first embodiment, a wiring substrate 5 including wiring layers (not shown) functioning as the electric wirings, is adhered and arranged on the outer surface (upper surface) of the cladding layer 22 on which the roughened surface RS is formed, of the optical waveguide 1 in FIG.

7. The wiring substrate 5 is a flexible wiring substrate that employs a polyimide film, or the like as the substrate.

The areas of the cladding layer 22 of the optical waveguide 1 except the light entering portions L1 and the light emitting portions L2 are formed as the roughened surface RS. By this matter, not only the optical crosstalk can be prevented, but also the adhesion of the wiring substrate 5 which is adhered onto the optical waveguide 1oan be improved by an anchor effect due to the roughened surface RE.

Also, a sealing layer 30 is formed on the outer surface (lower surface) of the underlying cladding layer 22 of the optical waveguide 1, thereby the air layers A are hermetically sealed. As the method of forming the sealing layer 30, a resin film such as an epoxy resin that is kept in a semi-cured state, or the like is pasted, and then the resin film is cured and adhered onto the underlying cladding layer 22 by applying the heating process.

In the present embodiment, the light paths are converted at the air boundary between the light path conversion inclined surface S and the air layer A. Therefore, it is necessary to prevent that the sealing layer 30 invades into the air layers A. For this purpose, as the sealing layer 30, a resin film having low fluidity when it is cured is used and the air layers A are remained by capping the air layers A with the sealing layer 30.

Here, in the case that there is no need to hermetically seal the air layers A of the optical waveguide 1, the sealing layer 30 may be omitted.

Then, a light emitting element 40 is connected to connection pads (not shown) of the wring substrate 5 and is mounted thereon such that this light emitting element 40 is optically coupled to the light path conversion inclined surface S for the light entering, located on one end side (left side) of the optical wave guide 1. The light emitting element 40 is mounted on the wiring substrate 5 in a state that light emitting portions are directed downward. As the light emitting element 40, a surface emitting laser (VCSEL: Vertical Cavity Surface Emitting Laser) is preferably used.

Also, a light receiving element 42 is connected to connection pads (not shown) of the wiring substrate 5 and is mounted thereon such that such light receiving element 42 is optically coupled to the light path conversion inclined surface S for the light emitting, located on the other end side (right side) of the optical waveguide 1. The light receiving element 42 is mounted on the wiring substrate 5 in estate that its light, receiving portions are directed downward. As the light receiving element 42, a photodiode is preferably used.

Light passing opening portions 7 for collectively exposing the light entering portions L1 and the light emitting portions L2 of the optical waveguide 1 are provided in the areas of the wiring substrate 5, which are located just under the light emitting element 40 and the light receiving element 42, respectively.

In the optical waveguide device 2 of the first embodiment, the lights are propagated from the light emitting element 40 to the light receiving element 42 via the light path indicated with a dot arrow in FIG. 9. To explain in detail, the electric signal being output from a first LSI chip (a driver, or the like) (not shown) is supplied to the light emitting element 40, and the lights emitted from the light emitting element 40 are entered to the light entering portions L1 of the optical waveguide 1.

The lights entered from the light entering portions L1 reach the light path conversion inclined surface S of the optical waveguide 1. Then, the lights are reflected at the air boundary between the light path conversion inclined surface S and the air layer A on one end, and the light paths are converted at 90°, and then the lights are entered to the core layer 24.

Then, the lights entered to the core layer 24 propagate through the core layer 24 while repeating a total reflection therein, and then reach the light path conversion inclined surface S on the other end side. Then, the lights are reflected at the air boundary between the light path conversion inclined surface S and the air layer A on the other end side, and the light paths are converted at 90°, and when the lights are emitted to the light receiving element 42 from the light emitting portions L2 of the optical waveguide 1.

The light receiving element 42 converts the light signals into the electric signals, and the electric signals are supplied to a second LSI chip (TIA: Transimpedance Amplifier, or the like) (not shown).

Here, in the case that the optical waveguide 1x (FIG. 8) utilizing the above both surface sides as the light path is used, the light receiving element 42 is mounted on the lower surface of the optical waveguide 1x such that this light receiving element 42 is optically coupled to the light, emitting portions L2 on the lower surface of the optical waveguide 1x.

Figure 10:
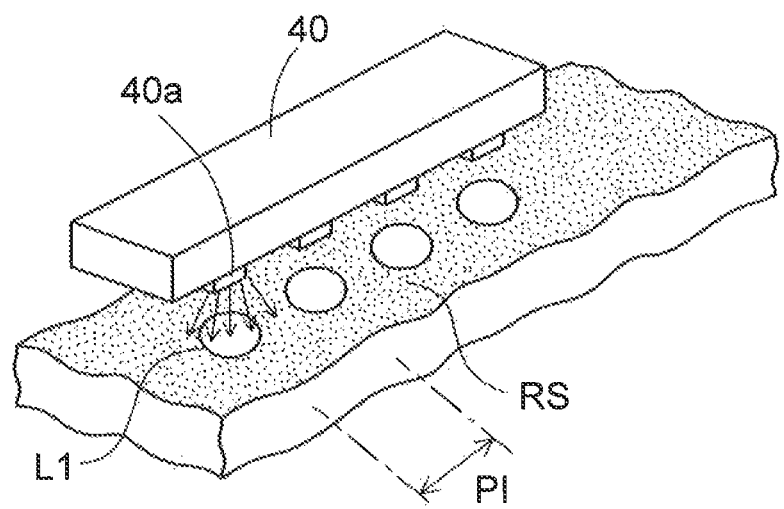
FIG. 10 is a perspective view depicting a state that the optical crosstalk is prevented in the optical waveguide device according to the first embodiment.

In FIG. 10, a state of the light emitting element 40 and the light entering portions L1 in the light passing opening portions 7 of the wiring substrate 5 in FIG. 9 is schematically depicted.

As depicted in FIG. 10, the light emitting element 40 has a plurality of light emitting portions 40a (in the example in FIG. 10, four light emitting channels), and the light emitted from the light, emitting portion 40a is emitted to spread to the lateral direction as well. For this reason, when an arrangement pitch PI of respective core layers 24 (light paths) is narrowed to about 250 μm, the unnecessary lights reflected at the outside areas of the light entering portions L1 are ready to enter to other adjacent light entering portions L1. As a result, the optical crosstalk is generated and thus degradation of the light signal is easily brought about.

In the first embodiment, the areas of the surface (the cladding layer 22) of the optical waveguide 1 except the light entering portions L1 and the light emitting portions L2 are formed as the roughened surface RS by applying the pearskin finish. Therefore, the lights entered to the outside areas of the light entering portions L1 are reflected diffusely and attenuated by the roughened surface RS. As a result, such a situation can be prevented that the unnecessary light signals are entered to the adjacent light entering portions L1.

By this matter, even though the arrangement pitch of the light entering portions L1 is made narrower, the generation of the optical crosstalk between the adjacent light entering portions L1 can prevented, and thus degradation of the light signals can be avoided.

Also, with regard to the light emitting portions L2 to which the light receiving element 42 is optically coupled (FIG. 9), similarly the reflected lights from the light path conversion inclined surface S, which are entered to the areas except the light emitting portions L2 are reflected diffusely and attenuated by the roughened surface RS of the optical waveguide 1. By this matter, the generation of the optical crosstalk between plurality of light receiving portions 42a of the light receiving element 42 can be prevented, and thus degradation of the light signals can be avoided.

Figure 17:
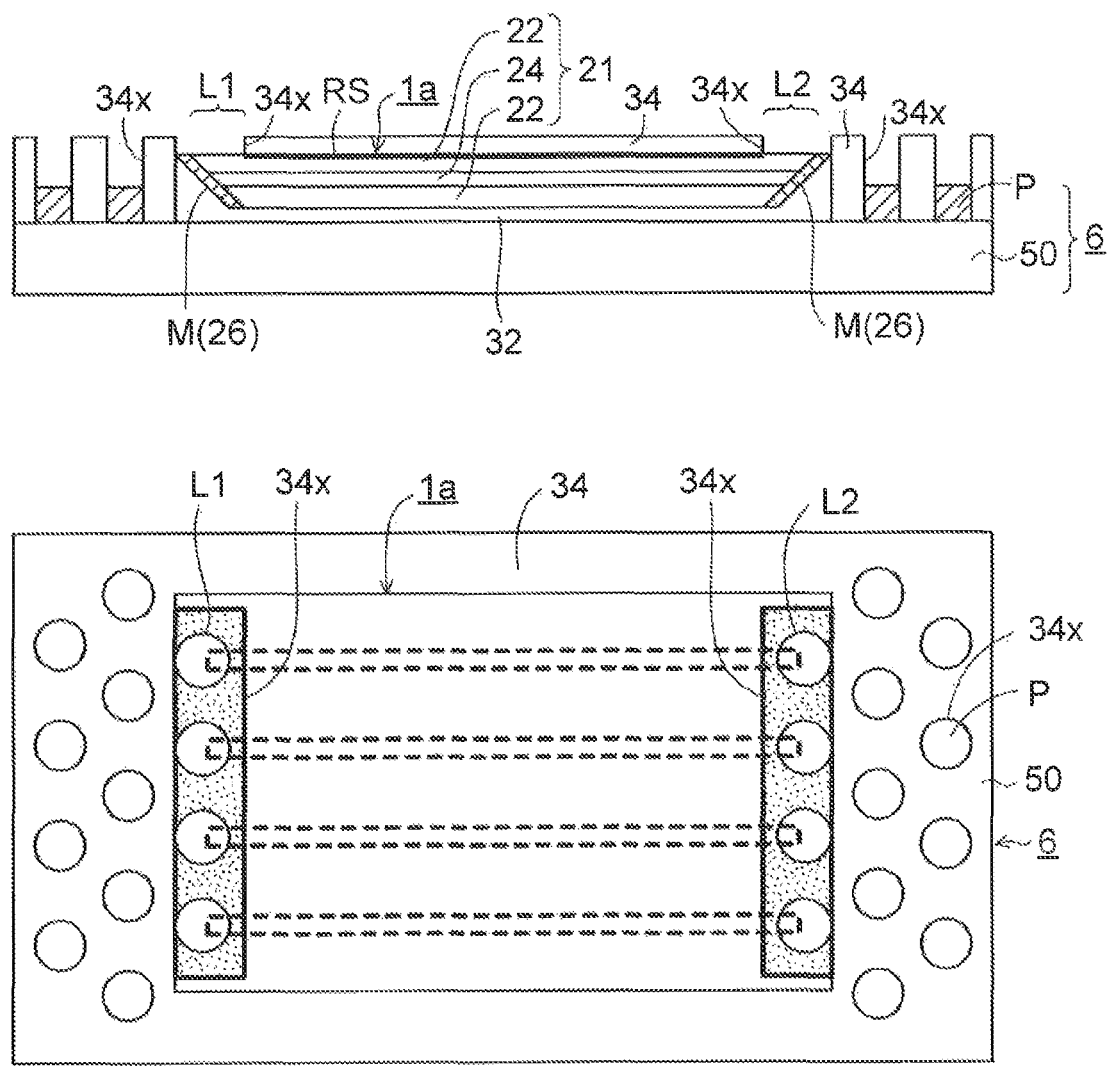
FIG. 17 is a sectional view and a plan view depicting a state that a protection insulating film is formed on the optical waveguide and the wiring substrate in FIG. 16.
Figure 18:
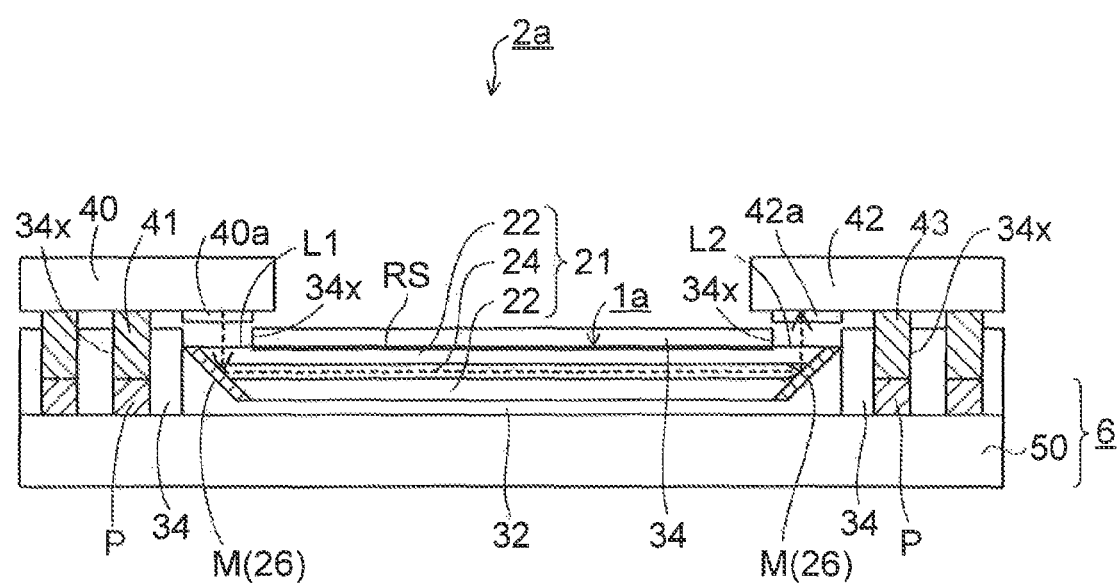
FIG. 18 is a sectional view depicting an optical waveguide device according to the second embodiment.

Moreover, the light entering portions L1 and the light emitting portions L2 of the optical waveguide 1 are not roughened, and are still kept as the smooth surface (transparent layer). Therefore, the diffused reflection of light is not caused, and thus both the light emitting element 40 and the light receiving element 42 can be optically coupled to the optical waveguide 1 with good reliability, Second Embodiment FIG. 11 to FIG. 16 are views depicting a method of manufacturing an optical waveguide according to a second embodiment, and FIG. 17 and FIG. 18 are views explaining an optical waveguide device according to the second embodiment.

In the second embodiment, the temporary substrate is not employed, and the optical waveguide is formed on a rigid type wiring substrate. In the second embodiment, as to the same steps and the same elements as those of the first embodiment, the same reference symbols are affixed and their detailed explanation will be omitted hereunder.

Figure 11:
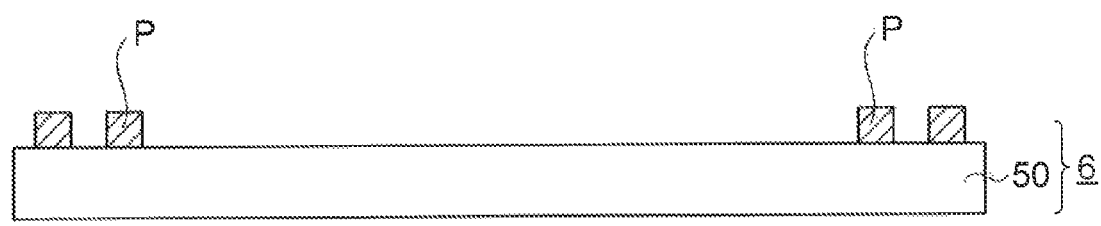
FIG. 11 is a sectional view and a plan view (#1) depicting a method of manufacturing an optical waveguide according to a second embodiment.
Figure 11:
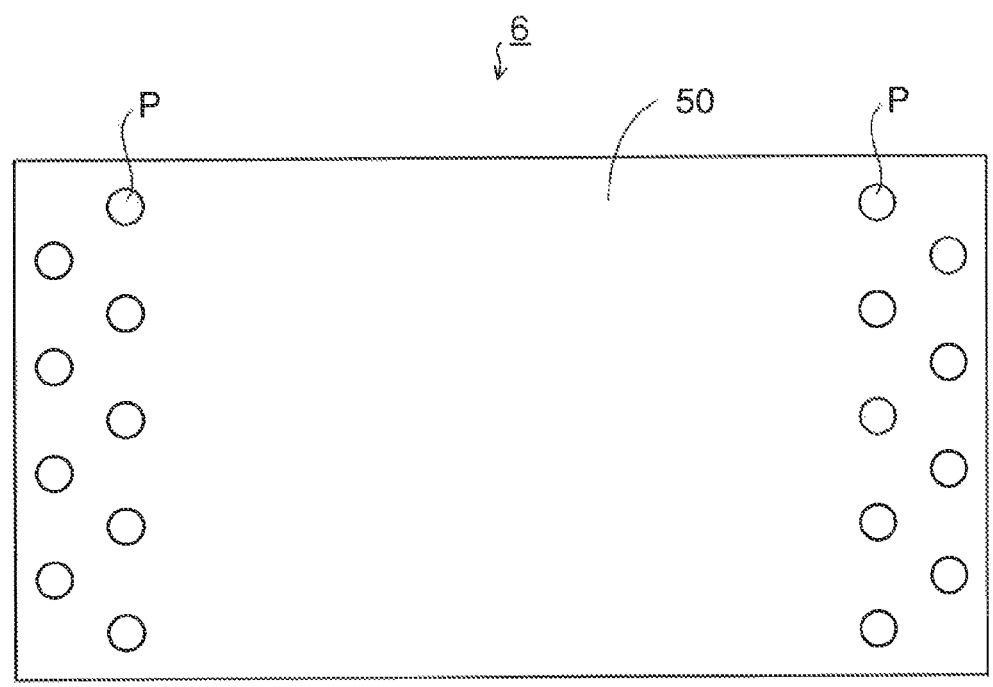

In the method or manufacturing the optical waveguide according to the second embodiment, as depicted in FIG. 11, first, a rigid type wiring substrate 6 having rigidity is prepared. In the wiring substrate 6, a plurality of connection pads P each functioning as the electric wiring are arranged side by side on both end parts of the upper surface side of an insulating substrate 50 which is made of a glass epoxy resin, or the like, respectively. Although not particularly depicted, the connection pads P are connected to the wiring layers formed on the lower surface side via the penetration electrodes which are provided in the insulating substrate 50.

Figure 12:
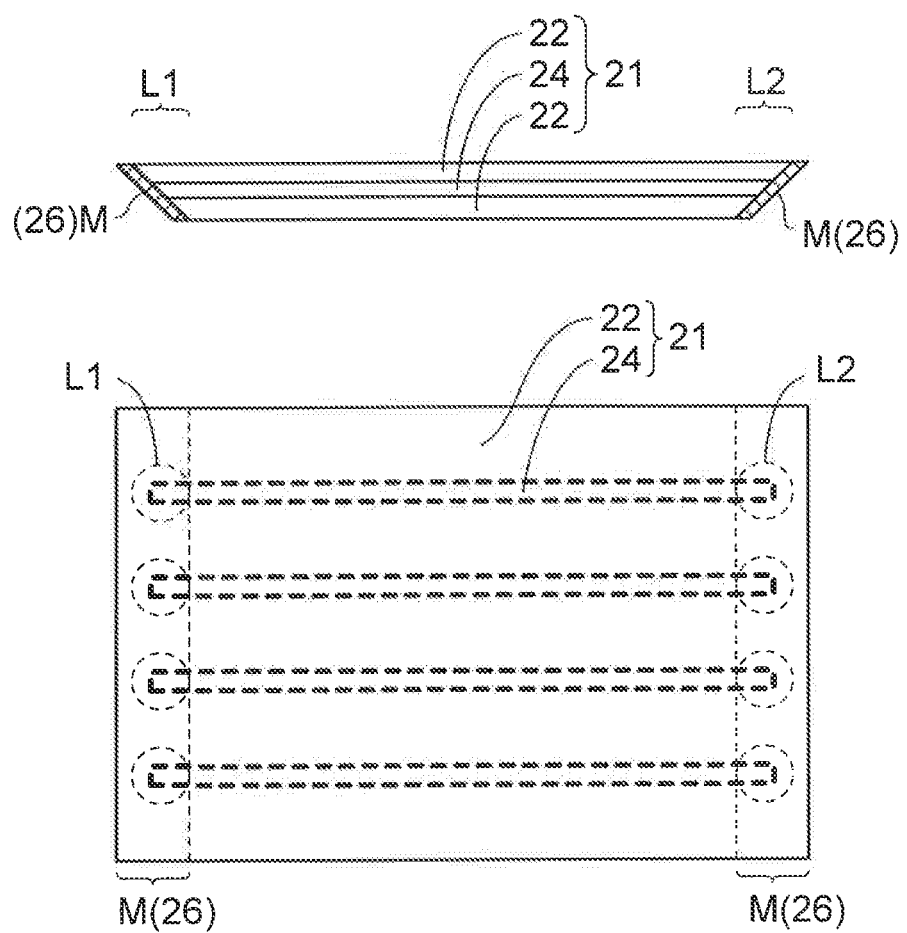
FIG. 12 is a sectional view and a plan view (#2) depicting the method of manufacturing the optical waveguide according to the second embodiment.

Then, as depicted in FIG. 12, an optical waveguide layer 21 having a structure in which the core layer 24 is surrounded by the cladding layer 22 is prepared. In the optical waveguide layer 21 according to the second embodiment, a metal layer 26 is arranged on the light path conversion inclined surfaces S provided to the terminal parts respectively, and the metal layer 26 functions as a light path conversion, mirror M path converting portion). As the metal layer 26, a gold (Au) layer, a silver (Ac) layer, an aluminum (Al layer, or the like, which has a good light reflectivity, is employed.

Then, like the first embodiment, the light path conversion mirror M provided on one end side (left side) of the optical waveguide layer 21 is used for the light entering. The light entering portions L1 are demarcated on the outer surface (upper surface) of the cladding layer 22 in the positions which correspond to the light path conversion mirror M.

Also, the light path conversion mirror M provided on the other end side (right side) of the optical waveguide layer 21 is used for the light emitting. The light emitting portions L2 are demarcated on the outer surface (upper surface) of the cladding layer 22 in the positions which correspond to the light path conversion mirror N.

Figure 13:
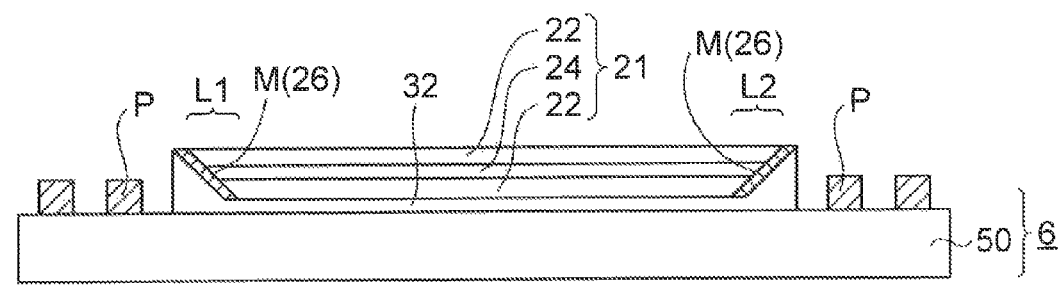
FIG. 13 is a sectional view and a plan view (#3) depicting the method of manufacturing the optical waveguide according to the second embodiment.
Figure 13:
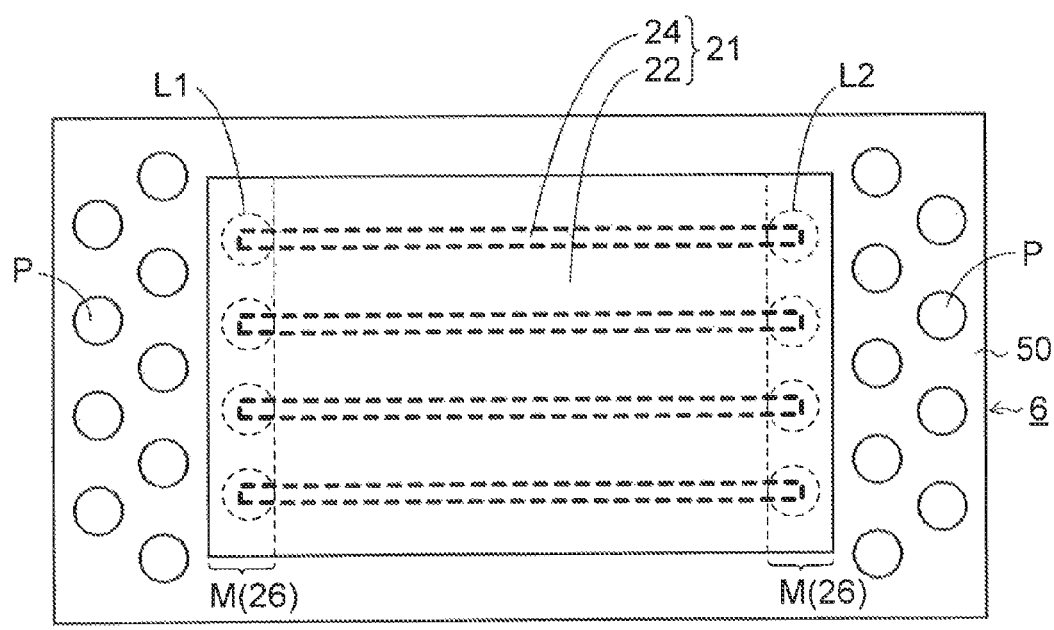

Then, as depicted in FIG. 13, the surface of the underlying cladding layer 22 of the optical waveguide layer 21 in FIG. 12 is adhered and secured to the wiring substrate 6 by an adhesive agent 32. At this time, side surfaces of the light path conversion mirrors M the metal layers 26) located on the termination portion sides of the optical waveguide layer 21 are filled with the adhesive agent 32.

Here, the optical waveguide 20 used in the first embodiment (FIG. 2) may be adhered onto the wiring substrate 6. In this case, like the first embodiment, the resin film kept in a semi-cured state is used as the adhesive agent, and thus the air layers A each contacting the light path conversion inclined surface S of the optical waveguide 20 are not filled with the adhesive agent, and are still remained as they are.

Figure 14:
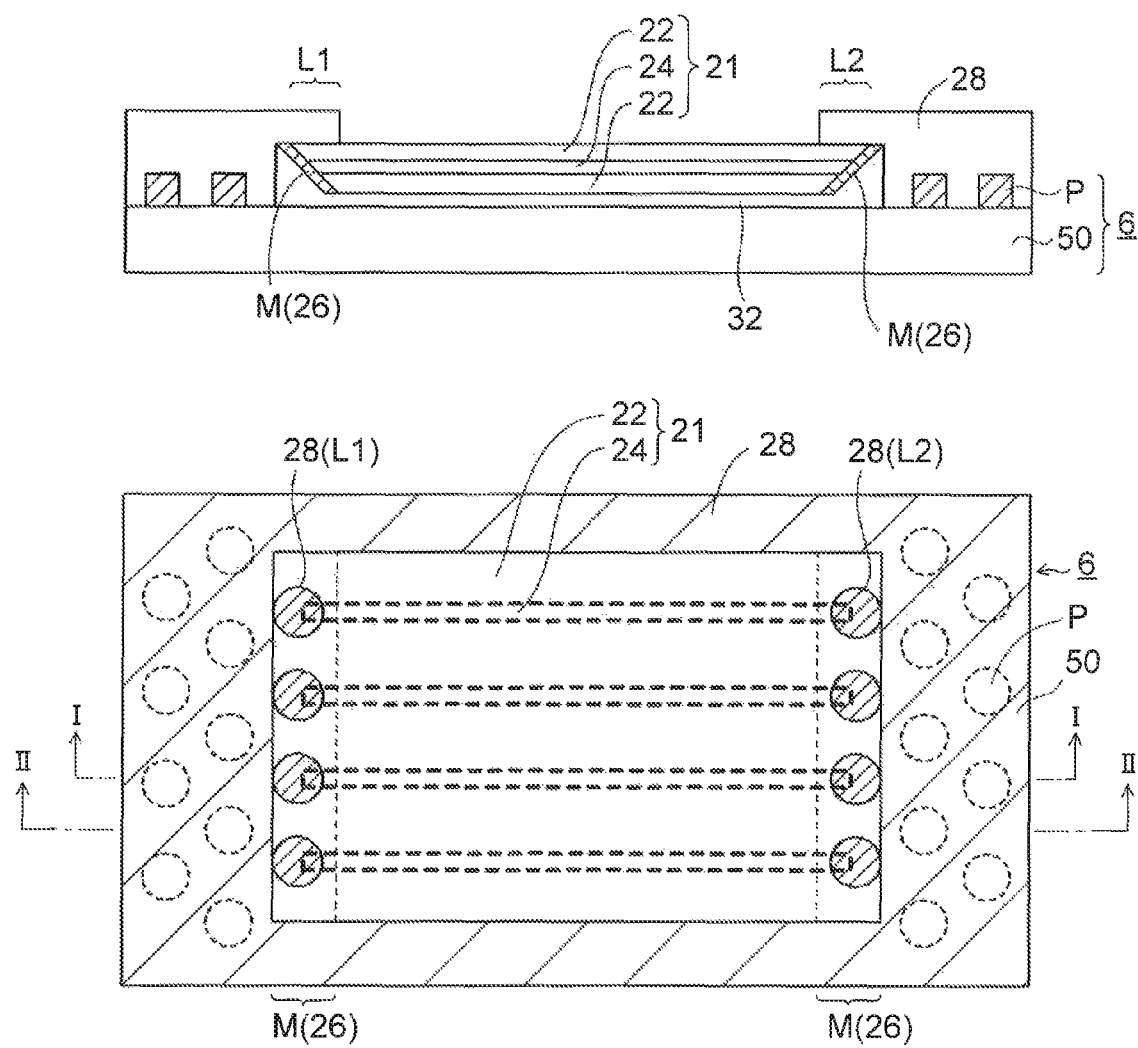
FIG. 14 is a sectional view and a plan view (#4) depicting the method of manufacturing the optical waveguide according to the second embodiment.

Then, like the first embodiment, as depicted in FIG. 14, the resist pattern 28 (mask pattern) is formed on the light entering portions L1 and the light emitting portions L2 of the cladding layer 22 of the optical waveguide layer 21 respectively to protect these portions L1, L2. Also, the resist pattern 28 is formed simultaneously on the wiring substrate 6 around the optical waveguide layer 21. In a plan view of FIG. 14, the resist pattern 28 is depicted as the hatched part.

A sectional view of FIG. 14 corresponds to a synthetic sectional view in which the connection pad P in a section taken along II-II in the plan view of FIG. 14 is added to a section taken along I-I in the plan view of FIG. 14. Also, the sectional views of FIGS. 15-17 are the synthetic sectional view similar to FIG. 14.

Figure 15:
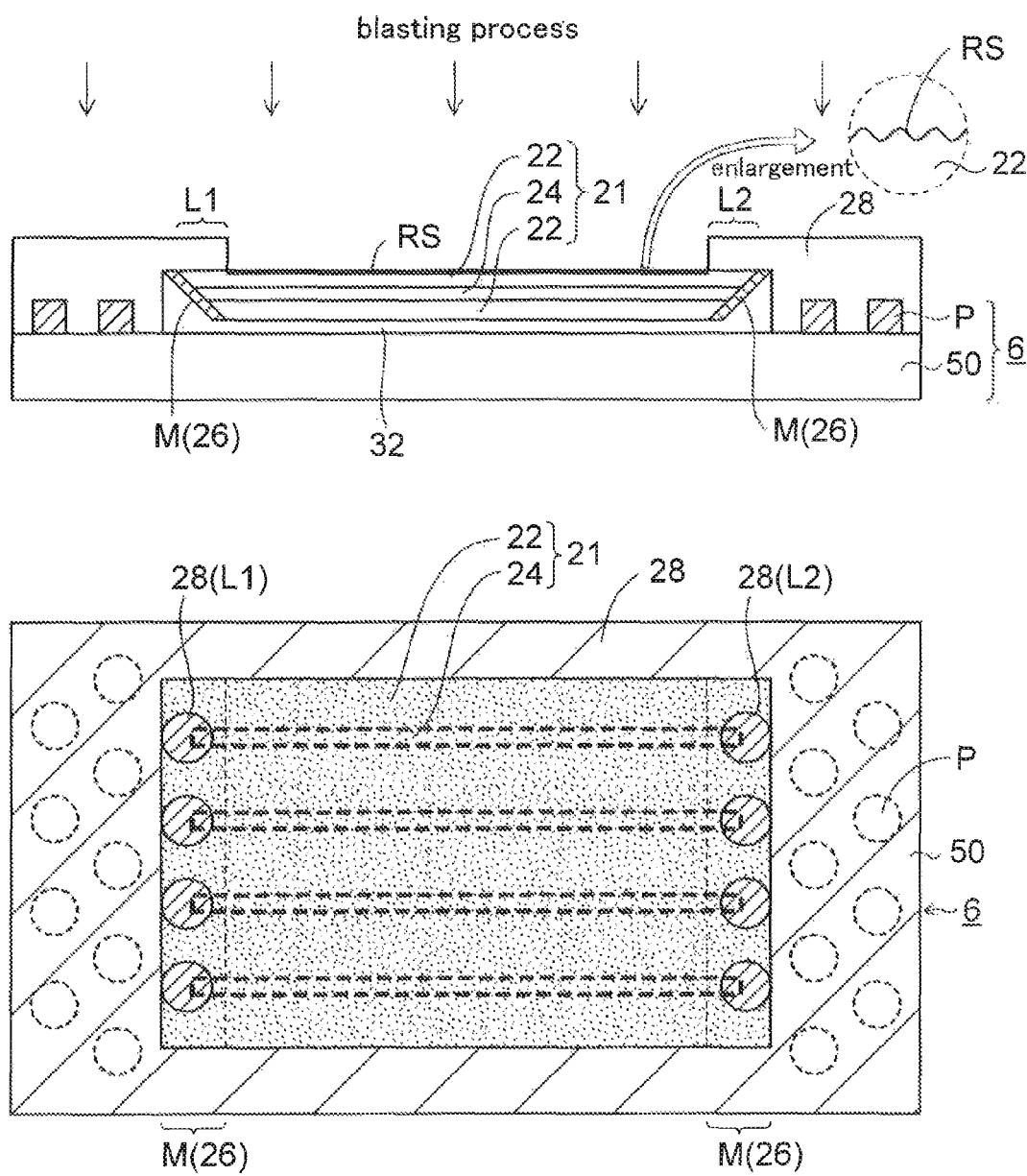
FIG. 15 is a sectional view and a plan view (#5) depicting the method of manufacturing the optical waveguide according to the second embodiment.

Subsequently, like the first embodiment, as depicted in FIG. 15, the blasting process is applied to the exposed surface of the cladding layer 22 while using the resist pattern 28 as a mask. Thus, the roughened surface RS is formed like the pear-skin finish.

Like the first embodiment, preferably a surface roughness (Ra) of the roughened surface RS of the cladding layer 22 should be set in a range of 1 μm or more and 3 μm or less.

Figure 16:
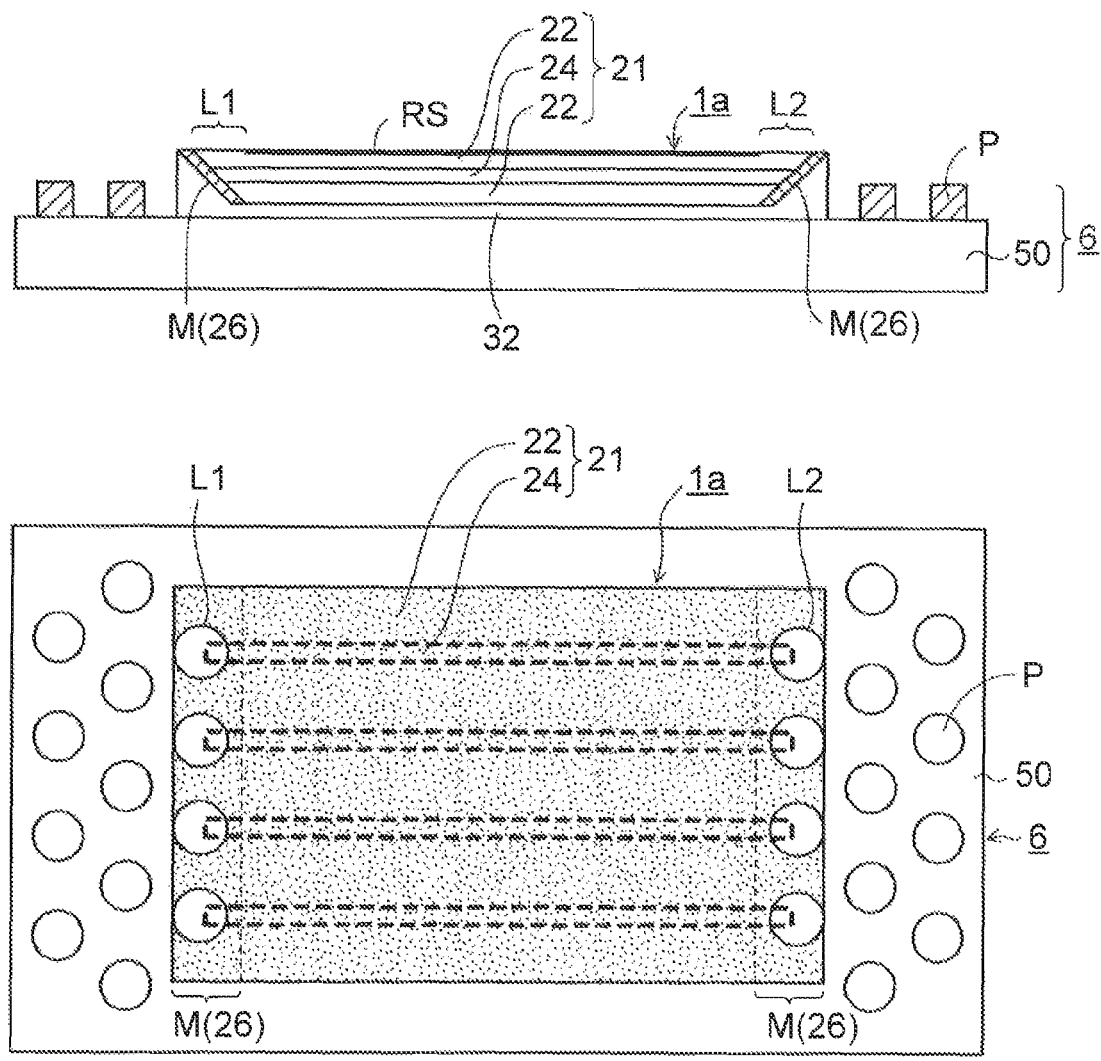
FIG. 16 is a sectional view and a plan view depicting the out waveguide according to the second embodiment, which is formed on a wiring substrate.

Then, as depicted in FIG. 16, the resist pattern 28 is removed. The light entering portions L1 and the light emitting portions L2 of the cladding layer 22 of the optical waveguide layer 21 are protected by the resist pattern 28. Therefore, these portions L1, L2 are not subjected to the blasting process, and are still maintained as the smooth surface (the transparent layer).

In this manner, like the first embodiment, the surface of the cladding layer 22 of the optical waveguide layer 21 except the light entering portions L1 and the light emitting portions L2 is formed as the roughened surface RS like the pear-skin finish. By this matter, an optical waveguide 1a according to the second embodiment can be obtained on the wiring substrate 6.

Then, as depicted in FIG. 17, a protection insulating layer 34 is formed on the optical waveguide 1a. In this protection insulating layer 34, opening portions 34x a plan view of FIG. 17, thick-line areas) for collectively exposing the light entering portions L1 and the light emitting portions L2 of the optical waveguide 1a respectively are formed. Also, the protection insulating layer 34 is formed simultaneously on the wiring substrate 6, and the opening portions 34x are provided in the protection insulating layer 34 on the connection pads P respectively.

The solder resist is used preferably as the protection insulating layer 34. This solder resist is formed based on the printing or the photolithography.

Like the first, embodiment, the surface of the cladding layer 22 of the optical waveguide 1a. It is formed as the roughened surface RS. Therefore, not only the optical crosstalk can be prevented, but also the adhesion of the protection insulating layer 34 formed on the optical wave guide layer 21 can be improved by the anchor effect.

Then, like the first embodiment, as depicted in FIG. 18, the light, emitting element 40 is connected to the connection pads P of the wiring substrate 6 via connection electrodes 41 and mounted thereon, such that this light emitting element 40 is optically coupled to the light path conversion mirror M for the light entering, located on one end side (left side) of the optical waveguide 1a. The light emitting element 40 is mounted in such a state that its light emitting portions 40a are directed downward.

Also, like the first embodiment, the light receiving element 42 is connected to the connection pads P of the wiring substrate 6 is connection electrodes 43 and is mounted thereon, such that this light receiving element 42 is optically coupled to the light path conversion mirror M for the light emitting, located on the other end side (right side) of the optical waveguide 1a. The light receiving element 42 is mounted in such a state that its light receiving portions 42a are directed downward.

By this matter, an optical wave guide device 2a according to the second embodiment is obtained.

Also in the second embodiment, as indicated with a dot-arrow in FIG. 18, the lights are propagated from the light emitting element 40 to the light receiving element 42 via the similar light paths to those in the first embodiment. In the first embodiment, the light paths are converted at 90° by the air boundary between the light path conversion inclined surface S and the air layer A. In contrast, in the second embodiment, the light paths are converted at 90° by the light path conversion mirror M.

That is, in the second embodiment, the lights emitted from the light emitting portions 40a of the light emitting element 40 reach the light path conversion mirror P located on one end side (left side) from the light entering portions L1 of the optical waveguide 1a. Then, the lights are reflected by the light path conversion mirror M, thereby the light paths are converted at 90°, and then the lights are entered to the core layers 24 respectively.

Then, the lights which are propagated through the core layers 24 are reflected by the light path conversion mirror M located on the other end side (right side), thereby the light paths are converted at 90°. Then, the lights are emitted to the light receiving portions 42a of the light receiving element 42 from the light emitting portions L2 of the optical waveguide 1a.

The optical waveguide 1a and the optical waveguide device 2a of the second embodiment can achieve the similar advantages to those of the first embodiment.

In the first and second embodiments mentioned above, the roughened surface RS is formed on the whole outer surface of the cladding layer 22 except the light entering portions L1 and the light emitting portions L2.

Figure 19:
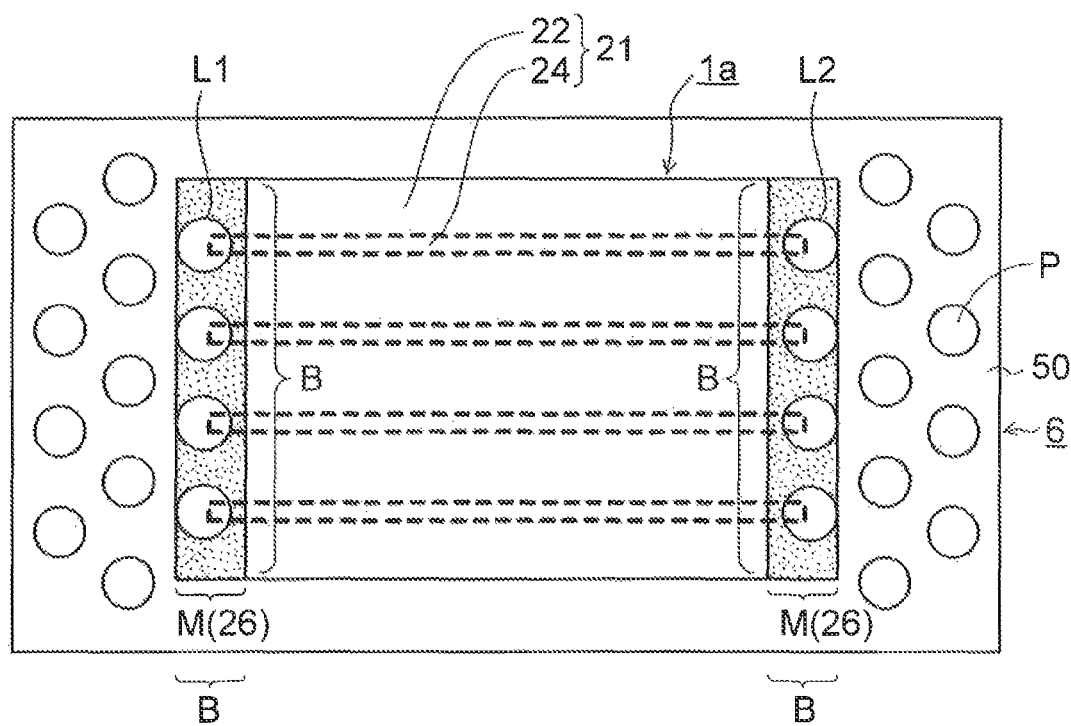
FIG. 19 is a plan view depicting another optical waveguide according to the second embodiment.

As another mode, as depicted in FIG. 19, the roughened surface RS may be formed partially on the peripheral parts of the portions L1, L2 (belt-like parts indicated with B) except the light entering portions L1 and the light emitting portions L2. That is, the roughened surface RS may be formed at least on the adjacent peripheral areas of the light entering portions L1 and the light emitting portions L2, out of the outer surface of the cladding layer 22 except the light entering portions L1 and the light emitting portions L2.

With the above, the preferred embodiment and variations, etc. are explained in detail. But the present invention is not limited to the above embodiments, and various variations and substitutions can be applied without departing from a scope being set forth in claims.

All examples and conditional language recited herein are intended for pedagogical purpose to aid the reader in understanding the invention and the concepts contributed by the inventor to furthering the art, and are to be construed as being without limitation to such specifically recited examples and conditions, nor does the organization of such examples in the specification relates to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An optical waveguide, comprising:
    an optical waveguide layer including a lower cladding layer, a plurality of core layers formed on the lower cladding layer, and an upper cladding layer covering the plurality of core layers;
    a plurality of light path converting portions provided to a light entering side and a light emitting side of both end sides of the plurality of core layers of the optical waveguide layer respectively;
    a plurality of light entering portions demarcated in an upper surface of the upper cladding layer located at a position corresponding to the light path converting portions of the light entering side; and
    a plurality of light emitting portions demarcated in an upper surface of the upper cladding layer located at a position corresponding to the light path converting portions of the light emitting side;
    wherein an entire area of the upper surface of the upper cladding layer in areas except the light entering portions and the light emitting portions is a roughened surface,
    each upper surface of the light entering portions and the light emitting portions is only a smooth surface,
    the roughened surface and the smooth surface are same face with the upper surface of the upper cladding layer and are same horizontal face over the whole,
    at least a portion of the roughened surface is in substantially the same plane as the smooth surface, and
    a transparent surface of the upper cladding layer is exposed in the smooth surface.

2. An optical waveguide according to claim 1, wherein the light path converting portion is formed of a light path conversion inclined surface which is an inner face of a groove which divides the lower cladding layer and the core layer, and an air layer which contacts the light path conversion inclined surface, wherein the air layer is in an area of the groove.

3. An optical waveguide according to claim 1, wherein the light path converting portion is formed of a light path conversion mirror made of a metal layer arranged on the light path conversion inclined surface provided in the cladding layer and the core layer.

4. An optical waveguide according to claim 1, wherein a surface roughness (Ra) of the roughened surface of the cladding layer is set in a range of 1 μm or more and 3 μm or less.

5. An optical waveguide device, comprising:
    the optical waveguide set forth in claim 1;
    a wiring substrate arranged on the roughened surface of the optical waveguide;
    a light emitting element mounted on the wiring substrate, and optically coupled to the light path converting portion of the light entering side of the optical waveguide; and
    a light receiving element mounted on the wiring substrate, and optically coupled to the light path converting portion of the light emitting side of the optical waveguide.

6. An optical waveguide device, comprising:
    the optical waveguide set forth in claim 1, and arranged such that the roughened surface is directed upward;
    a wiring substrate arranged under the optical waveguide;
    a protection insulating layer formed on the roughened surface of the optical waveguide, and in which an opening portion is provided on the light entering portion and the light emitting portion of the optical waveguide;
    a light emitting element mounted on an arranging side of the optical waveguide of the wiring substrate, and optically coupled to the light path converting portion of the light entering side of the optical waveguide; and
    a light receiving element mounted on an arranging side of the optical waveguide of the wiring substrate, and optically coupled to the light path converting portion of the light emitting side of the optical waveguide.

7. An optical waveguide, comprising:
    an optical waveguide layer including a lower cladding layer, a plurality of core layers formed on the lower cladding layer, and an upper cladding layer covering the plurality of core layers;
    a plurality of light path converting portions provided to a light entering side and a light emitting side of both end sides of the plurality of core layers of the optical waveguide layer, respectively;

a plurality of light entering portions demarcated in an upper surface of the upper cladding layer located at a position corresponding to the light path converting portions of the light entering side; and a plurality of light emitting portions demarcated in an upper surface of the upper cladding layer located at a position corresponding to the light path converting portions of the light emitting side;

wherein only a peripheral part of the upper surface of the upper cladding layer located in the peripheral part of the light entering portions and the light emitting portions is partially formed as a roughened surface, each upper surface of the light entering portions and the light emitting portions is only a smooth surface, the roughened surface and the smooth surface are same face with the upper surface of the upper cladding layer, the upper face of the upper cladding layer including the roughened surface and the smooth surface are same horizontal face over the whole, at least a portion of the roughened surface is in substantially the same plane as the smooth surface, and a transparent surface of the upper cladding layer is exposed in the smooth surface.

8. An optical waveguide according to claim 7, wherein the light path converting portion is formed of a light path conversion inclined surface which is an inner face of a groove which divide the lower cladding layer and the core layer, and an air layer which contacts the light path conversion surface, wherein the air layer is in an area of the groove.

9. An optical waveguide according to claim 7, wherein the light path converting portion is formed of a light path conversion mirror made of a metal layer arranged on the light path conversion inclined surface provided in the cladding layer and the core layer.

* * * * *